United States Patent
Ji et al.

(10) Patent No.: US 7,190,406 B2
(45) Date of Patent: Mar. 13, 2007

(54) IMAGE ADAPTIVE DEINTERLACING METHOD AND DEVICE BASED ON EDGE

(75) Inventors: Eun-Seok Ji, Yongin-si (KR); Yong-Joon Jung, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 449 days.

(21) Appl. No.: 10/911,323

(22) Filed: Aug. 4, 2004

(65) Prior Publication Data
US 2005/0073607 A1    Apr. 7, 2005

(30) Foreign Application Priority Data
Oct. 2, 2003    (KR) ...................... 10-2003-0068879

(51) Int. Cl.
*H04N 7/13* (2006.01)
(52) U.S. Cl. .................................... 348/448
(58) Field of Classification Search ............... 348/448, 348/441, 449, 458, 459
See application file for complete search history.

(56) References Cited

U.S. PATENT DOCUMENTS

| | | | |
|---|---|---|---|
| 5,103,306 A * | 4/1992 | Weiman et al. .......... | 348/400.1 |
| 5,689,305 A * | 11/1997 | Ng et al. ................ | 375/240.15 |
| 7,035,481 B2 * | 4/2006 | Kim et al. ................. | 382/300 |

2005/0063582 A1 *  3/2005  Park et al. .................. 382/154

FOREIGN PATENT DOCUMENTS

| KR | 10-2001-0005277 | 1/2001 |
|---|---|---|
| KR | 10-2001-0073262 | 8/2001 |

* cited by examiner

*Primary Examiner*—Paulos Natnael
(74) *Attorney, Agent, or Firm*—Mills & Onello LLP

(57) ABSTRACT

The present invention relates to a deinterlacing device and method for converting a video signal of an interlaced scan format into a video signal of a progressive scan format. The deinterlacing method including the steps of: measuring an edge gradient from a series of pixels provided in an upper scan line and a series of pixels provided in a lower scan line with reference to a pixel to be interpolated; determining an interpolation method on the basis of the measured edge gradient; calculating a difference value for each of pixel pair combinations, each of the pixel pair combinations having at least one pixel pair, the pixel pair having two pixels each one from each of the upper and lower scan lines with reference to the pixel to be interpolated, each of the pixel pair combinations having the pixel pairs that are adjacent to one another, the pixel pair combinations having different directions from one another; determining an edge direction on the basis of a direction of the pixel pair combination having the smallest difference value; and performing an interpolation for the pixel depending on the determined interpolation method and the determined edge direction.

35 Claims, 9 Drawing Sheets

IMAGE ADAPTIVE DEINTERLACING METHOD AND DEVICE BASED ON EDGE

RELATED APPLICATION

This application relies for priority on Korean patent application number 2003-68879, filed on Oct. 2, 2003, the contents of which are incorporated herein in their entirety by reference.

BACKGROUND OF THE INVENTION

1. Field of the Invention

The present invention relates to a digital video signal processing, and more particularly, to a deinterlacing device and method for converting a video signal of an interlaced scan format into a video signal of a progressive scan format.

2. Description of the Related Art

Deinterlacing is typically classified as intra-field interpolation using spatial correlation or inter-field interpolation using intra-field information and inter-field information on the basis of the spatial correlation and temporal correlation to perform interpolation. The intra-field interpolation uses only the intra-field information on the basis of the spatial correlation to perform the interpolation, and is represented as a line repetition, a line average, an Edge-based Line Average (ELA) and the like. The inter-field interpolation uses the intra-field information and the inter-field information on the basis of the spatial correlation and the temporal correlation to perform the interpolation, and is represented as a motion compensated interpolation and a motion adaptive compensated interpolation. Generally, the inter-field interpolation is known in the art as having excellent performance, but has a disadvantage in that construction is complicated and price is high due to an additional field memory that is needed for use of the inter-field information. In contrast, the intra-field interpolation does not perform as well as inter-field interpolation, but has an advantage in that construction is simple and price is low.

Since the Line Average of the intra-field interpolation performs the interpolation by using an average value of upper and lower-direction pixels, jagging occurs at a low gradient edge, thereby causing picture quality to be degraded.

Since the ELA performs the interpolation by using edge information of an image, thereby effectively preventing the jagging from occurring at the edge of the image, it has a good performance in the intra-field interpolation. However, the ELA cannot detect an actual edge and can erroneously detect a direction at a region having a vertical edge, at a region where the image is not distinct in brightness difference, and at a region having many high-frequency components of the image. This causes the picture quality to be rather degraded due to the generation of a distinct erroneous high frequency component. Even though the ELS has an excellent interpolation performance, the ELS has a tendency to be used, due to the above disadvantages, in an intra-field interpolation device using a recent popularized motion adaptive way than a separate deinterlacing device. However, since much improvement is still required for the degradation of the picture quality, which is caused by erroneous interpolation, various ELSs are under development.

SUMMARY OF THE INVENTION

Accordingly, the present invention is directed to an image adaptive deinterlacing method and device based on an edge that substantially obviates one or more problems due to limitations and disadvantages of the related art.

It is a feature of the present invention to provide an image adaptive deinterlacing method and device based on an edge in which a picture quality is improved.

In an aspect of the present invention, there is provided a deinterlacing method including the steps of: measuring an edge gradient from a series of pixels provided in an upper scan line and a series of pixels provided in a lower scan line with reference to a pixel to be interpolated; determining an interpolation method on the basis of the measured edge gradient; calculating a difference value for each of a plurality of pixel pair combinations, each of the pixel pair combinations having at least one pixel pair, the pixel pair having two pixels each of which being from one of the upper and lower scan lines with reference to the pixel to be interpolated, each of the pixel pair combinations having pixel pairs that are adjacent to one another, the pixel pair combinations having different directions from one another; determining an edge direction on the basis of a direction of the pixel pair combination having the smallest difference value; and performing an interpolation for the pixel depending on the determined interpolation method and the determined edge direction.

In one embodiment, the edge gradient measuring step includes the steps of: obtaining a MHD (Mean of Horizontal Difference) of the pixels provided in the upper and lower scan lines; and obtaining a MVD (Mean of Vertical Difference) of the pixels provided in the upper and lower scan lines.

In this embodiment, the MHD is a mean value of absolute values of differences of respective adjacent pixel pairs provided in the upper scan line and absolute values of differences of respective adjacent pixel pairs provided in the lower scan line, and the MVD is a mean value of absolute values of differences of respective facing pixel pairs among the pixels provided in the upper scan line and the pixels provided in the lower scan line.

In one embodiment, in the interpolation-method determining step, the interpolation method is determined on the basis of a relation of the MHD and the MVD.

In this embodiment, in the interpolation method determining step, when the MHD is larger than the MVD, a Line Average is determined to be the interpolation method.

In this embodiment, in the interpolation method determining step, when the MVD is not larger than the MHD, an ELA (Edge-based Line Average) is determined to be the interpolation method.

In this embodiment, in the edge direction determining step, when the determined interpolation method is the ELA, a direction of a pixel pair, which is adjacent to the pixel to be interpolated, among the pixel pairs of the pixel pair combination having the smallest difference value, is determined to be the edge direction.

In this embodiment, in the edge direction determining step, when the pixel pair combination having the smallest difference value has odd-numbered pixel pairs, a direction of a pixel pair, which passes over the pixel to be interpolated, among the pixel pairs, is determined to be the edge direction.

In this embodiment, in the interpolation performing step, when the pixel pair combination having the smallest difference value has the odd-numbered pixel pairs, a mean value of two pixels having the determined edge direction is set as a value of a pixel to be interpolated.

In this embodiment, in the edge direction determining step, when the pixel pair combination having the smallest difference value has even-numbered pixel pairs, a direction between two pixel pairs, which are adjacent to the pixel to be interpolated, among the pixel pairs, is determined to be the edge direction.

In this embodiment, in the interpolation performing step, when the pixel pair combination having the smallest difference value has the even-numbered pixel pairs, a mean value of four pixels adjacent to the determined edge direction is set as the value of the pixel to be interpolated.

In this embodiment, in the interpolation performing step, when the determined interpolation method is a Line Average, a mean value of two pixels having a vertical direction with respect to the pixel to be interpolated, among the pixels provided in the upper and lower scan lines, is set as the value of the pixel to be interpolated.

In this embodiment, the difference value of the pixel pair combination is a mean value of an absolute value of a difference value of at least one pixel pair provided in the pixel pair combination.

In another aspect of the present invention, there is provided a deinterlacing device including: an interpolation-method determining unit for measuring an edge gradient from a series of pixels provided in an upper scan line and a series of pixels provided in a lower scan line with reference to a pixel to be interpolated, and determining an interpolation method on the basis of the measured edge gradient; an edge-direction determining unit for calculating a correlation for each of pixel pair combinations, and determining an edge direction on the basis of a direction of a pixel pair combination having the largest correlation among the pixel pair combinations, each of the pixel pair combinations having at least one pixel pair, each pixel pair having two pixels each of which being from each of the upper and lower scan lines with reference to the pixel to be interpolated, each of the pixel pair combinations having pixel pairs that are adjacent to one another, the pixel pair combinations having different directions from one another; and an interpolating unit for performing an interpolation for the pixel depending on the determined interpolation method and the determined edge direction.

In one embodiment, the interpolation method determining unit includes: a MHD (Mean of Horizontal Difference) calculator for obtaining a MHD of the pixels provided in the upper and lower scan lines; a MVD (Mean of Vertical Difference) calculator for obtaining a MVD of the pixels provided in the upper and lower scan lines; and an interpolation method determiner for determining the interpolation method on the basis of the MHD and the MVD In this embodiment, the MHD is a mean value of absolute values of differences of respective adjacent pixel pairs provided in the upper scan line and absolute values of differences of respective adjacent pixel pairs provided in the lower scan line.

In this embodiment, when the upper and lower scan lines respectively have the number (2N+1) of pixels, the MHD is calculated in the following Equation:

$$MHD = \frac{\sum_{m=-N}^{N-1} w\_h_m \{|Y(i-1, j+m) - Y(i-1, j+m+1)| + |Y(i+1, j+m) - Y(i+1, j+m+1)|\}}{2 \cdot \sum_{m=-N}^{N} w\_h_m}$$

where "$w\_h_m$" is a weighted value depending on a position of each pixel difference.

In this embodiment, the MVD is a mean value of absolute values of differences of respective facing pixel pairs among the pixels provided in the upper scan line and the pixels provided in the lower scan line.

In this embodiment, when the upper and lower scan lines respectively have the number (2N+1) of pixels, the MVD is calculated in the following Equation:

$$MVD = \frac{\sum_{n=-N}^{N} w\_v_n |Y(i-1, j+n) - Y(i+1, j+n)|}{\sum_{n=-N}^{N} w\_v_n}$$

where "$w\_v_n$" is a weighted value depending on a position of each pixel difference.

In this embodiment, the interpolation method determiner determines a Line Average as the interpolation method when the MHD is larger than the MVD.

In this embodiment, the interpolation method determiner determines an ELA (Edge-based Line Average) as the interpolation method when the MVD is not larger than the MHD.

In this embodiment, the edge-direction determining unit includes: a correlation calculator for calculating the correlation of each of the pixel pair combinations; and an edge direction determiner for determining the edge direction on the basis of the pixel pair combination having the largest correlation among the pixel pair combinations.

In this embodiment, the correlation calculator includes a plurality of calculating units respectively corresponding to the pixel pair combinations, for calculating a difference value of the corresponding pixel pair combination.

In this embodiment, the difference value of the pixel pair combination is a mean value of an absolute value of a difference value of at least one pixel pair provided in the pixel pair combination.

In this embodiment, when the determined interpolation method is the ELA, the edge-direction determining unit determines, as the edge direction, a direction of a pixel pair, which is adjacent to the pixel to be interpolated, among the pixel pairs of the pixel pair combination having the smallest difference value.

In this embodiment, when the pixel pair combination having the smallest difference value has odd-numbered pixel pairs, the edge direction determiner determines, as the edge direction, a direction of a pixel pair, which passes over the pixel to be interpolated, among the pixel pairs.

In this embodiment, when the pixel pair combination having the smallest difference value has the odd-numbered pixel pairs, the interpolating unit sets, as a value of the pixel to be interpolated, a mean value of two pixels having the determined edge direction.

In this embodiment, when the pixel pair combination having the smallest difference value has even-numbered pixel pairs, the edge direction determiner determines, as the edge direction, a direction between two pixel pairs, which are adjacent to the pixel to be interpolated, among the pixel pairs.

In this embodiment, when the pixel pair combination having the smallest difference value has the even-numbered pixel pairs, the interpolating unit sets, as the value of the pixel to be interpolated, a mean value of four pixels adjacent to the determined edge direction.

In this embodiment, when the determined interpolation method is a Line Average, the interpolating unit determines the value of the pixel to be interpolated to be a mean value of two pixels having a vertical direction with respect to the pixel to be interpolated, among the pixels provided in the upper and lower scan lines.

In this embodiment, the interpolating unit includes: a plurality of interpolators respectively corresponding to the pixel pair combinations, for calculating an interpolation value from the corresponding pixel pair combination; and a selector for selecting one of the interpolation values of the interpolators as the value of the pixel to be interpolated, depending on the interpolation method determined by the interpolation-method determining unit and the edge direction determined by the edge-direction determining unit.

In this embodiment, each of the interpolators calculates a mean value of at least one pixel pair, which is adjacent to the pixel to be interpolated, among the pixel pairs provided in the corresponding pixel pair combination, and outputs the calculated mean value as the interpolation value.

In this embodiment, when the pixel pair combination having the smallest difference value has the odd-numbered pixel pairs, each of the interpolators sets, as the value of the pixel to be interpolated, the mean value of two pixels having the determined edge direction.

In this embodiment, when the pixel pair combination having the smallest difference value has the even-numbered pixel pairs, the interpolating unit sets, as the value of the pixel to be interpolated, the mean value of four pixels adjacent to the determined edge direction.

It is to be understood that both the foregoing general description and the following detailed description of the present invention are exemplary and explanatory and are intended to provide further explanation of the invention as claimed.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The present invention provides a deinterlacing device and method in which a field to be interpolated is divided into a low gradient edge region and a region having other characteristics and then, an ELA is applied at the low gradient edge region to minimize jagging and a Line Average is applied at another region to minimize error, thereby improving an entire picture quality. The present invention has stable performance by using a horizontal difference and a vertical difference, which are adaptive to an image characteristic at the time of dividing into two regions, in comparison with a conventional method using a fixed critical value. When the ELA is used to search a direction having a large similarity, the present invention obtains and averages maximal-numbered pixel difference values, which are available within the window, for respective directions, thereby preventing erroneous interpolation from being effected by a high frequency component. The present invention can not only be used as a separate deinterlacing device, but can be also used as an intra-field interpolation of a motion adaptive deinterlacing approach.

Figure 1:
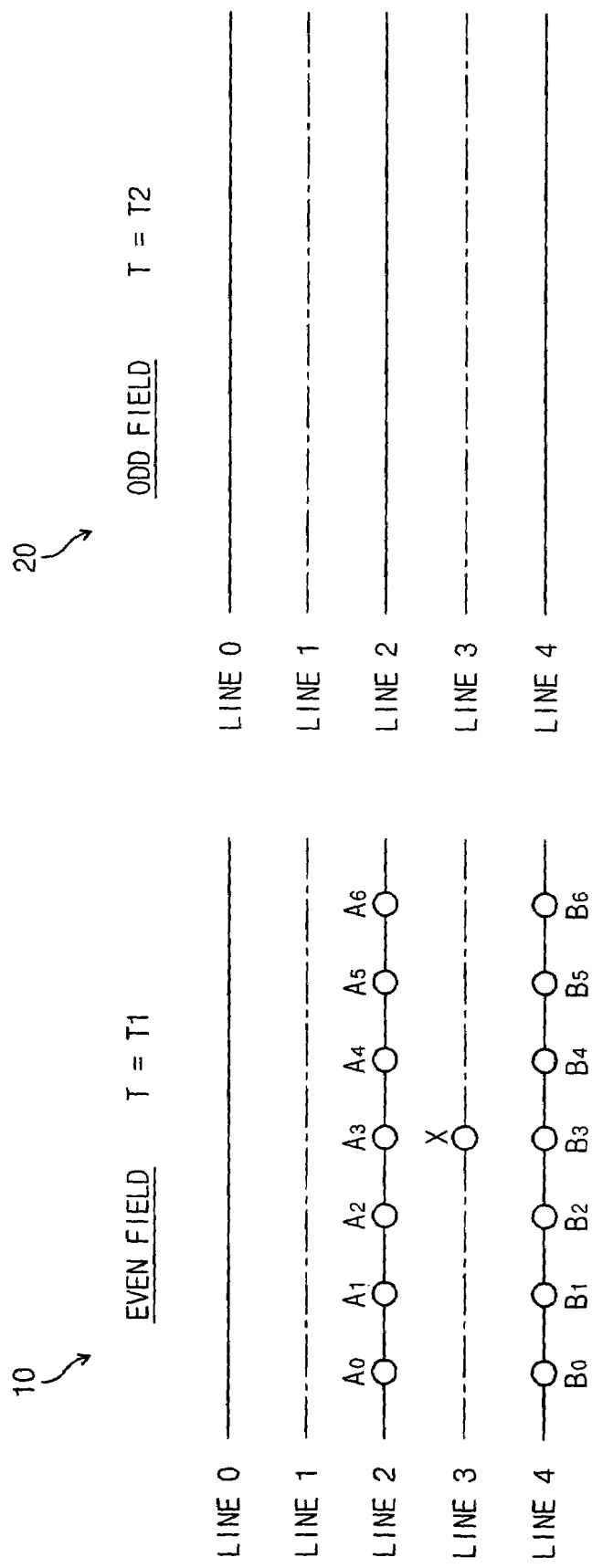
FIG. 1 is a schematic diagram illustrating an even field and an odd field of a video signal of a general interlaced scan format.

FIG. 1 is a view illustrating an even field 10 and an odd field 20 of a video signal of a general interlaced scan format.

The even field 10 includes even scanning lines 0, 2 and 4, and the odd field 20 includes odd scanning lines 1, 3 and 5. The even field 10 is scanned at T=T1, and the odd field 20 is scanned at T=T2. For example, in order to construct a full frame at the even field 10, each of missing lines (for example, line 3) should be reconstructed (or interpolated). For example, a pixel element X of a line 3 of the even field 10 should be interpolated. In FIG. 1, solid lines denote lines that are scanned at a given field, and chain lines denote missing lines that need interpolation.

Figure 2:
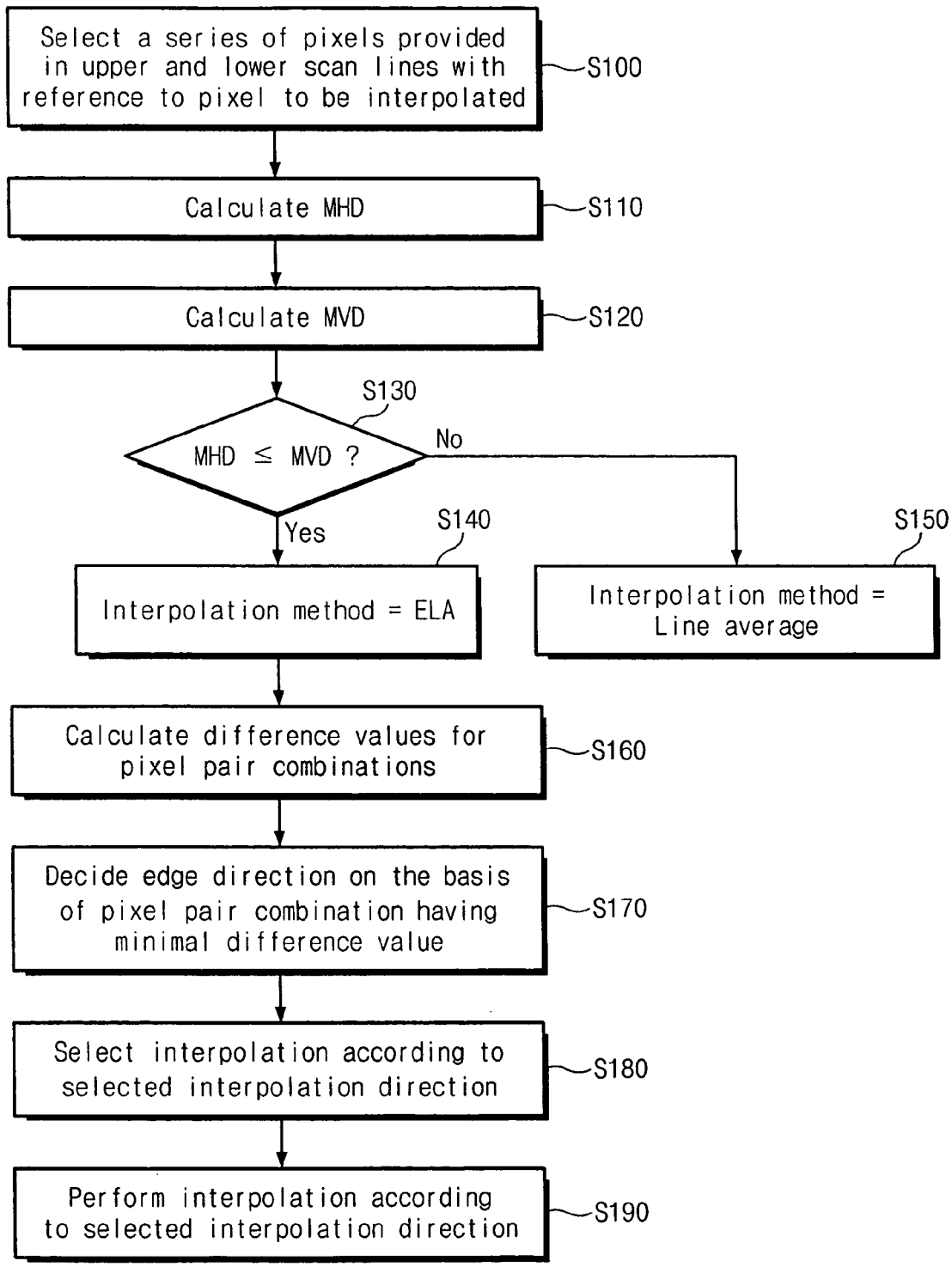
FIG. 2 is a flowchart illustrating a deinterlacing method according to an embodiment of the present invention.

FIG. 2 is a flowchart illustrating a deinterlacing method according to an embodiment of the present invention.

First, a series of pixels, which are included in upper and lower scan lines with reference to the pixel X to be interpolated, are selected (S100). A mean of horizontal difference (MHD) of the selected pixels, which are included in the upper and lower scan lines, is calculated (S110). A mean of vertical difference (MVD) of the selected pixels, which are included in the upper and lower scan lines, is calculated (S120). The MHD is compared with the MVD (S130). If the MVD is larger than the MHD, an interpolation method is determined to be an Edge-based Line Average (ELA) (S140). Otherwise, the interpolation method is determined to be a Line Average (S150).

Difference values for respective pixel pair combinations are calculated (S160). The pixel pair combinations include at least one pixel pair having two pixels each one from each of upper and lower scan lines. An edge direction is determined on the basis of a pixel pair combination having a minimal difference value (S170). According to the determined interpolation method and edge direction, an interpolation direction is selected (S180). According to the selected interpolation direction, interpolation is performed (S190).

Figure 3:
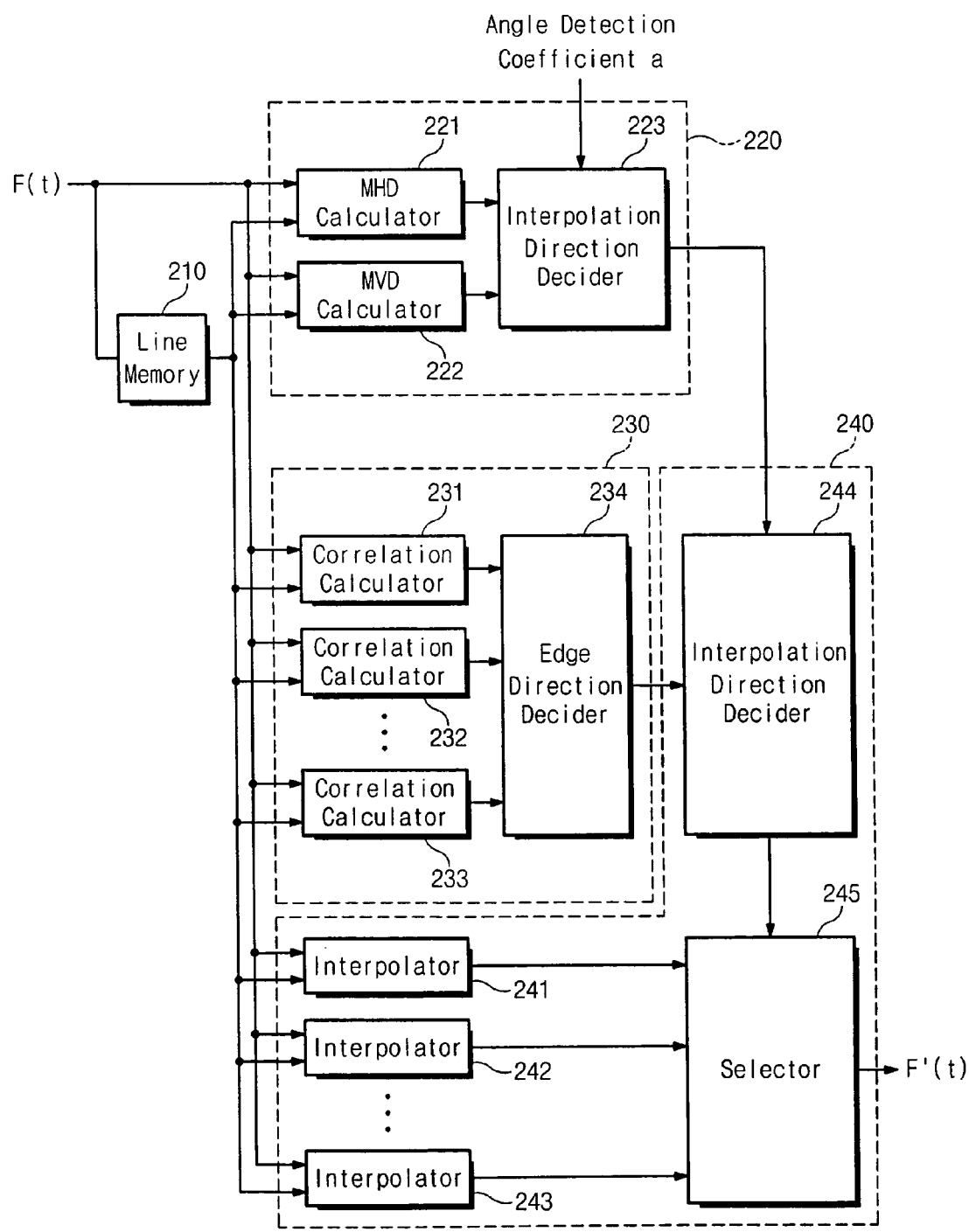
FIG. 3 is a schematic block diagram illustrating a deinterlacing device according to an embodiment of the present invention.

FIG. 3 is a view illustrating a deinterlacing device according to an embodiment of the present invention.

Each of the upper and lower scan lines with reference to the pixel X to be interpolated includes seven pixels. The deinterlacing device 200 includes a line memory 210 with a size for storing video data of one scan line therein. The line memory 210 stores video data of an upper scan line therein. If the video data of a lower scan line is inputted, the line memory 210 sequentially stores the inputted video data of the lower scan line.

The deinterlacing device 200 includes an interpolation method determining unit 220, an edge direction determining unit 230 and an interpolating unit 240. The interpolation method determining unit 220 measures an edge gradient from the series of pixels of the upper scan line and the series of pixels of the lower scan line with reference to the pixel to be interpolated, and determines the interpolation method on the basis of the measured edge gradient. The edge-direction determining unit 230 calculates the difference values for the pixel pair combinations, and determines the edge direction on the basis of a direction of a pixel pair combination having the smallest difference value among the pixel pair combinations. The pixel pair combination includes at least one pixel pair. The pixel pair includes two pixels each one from each of the upper and lower scan lines with reference to the pixel X. The pixel pairs of the pixel pair combination are adjacent to one another, and have different directions from one another. The interpolating unit 240 performs the interpolation for the pixel X depending on the interpolation method determined by the interpolation method determining unit 220 and the edge direction determined by the edge direction determining unit 230. Detailed constructions and functions of the interpolation method determining unit 220, the edge direction determining unit 230 and the interpolating unit 240 are in accordance with the following.

As shown in FIG. 1, the upper scan line of the pixel X to be interpolated includes seven pixels $A_0, A_1, A_2, A_3, A_4, A_5$ and $A_6$, and the lower scan line includes seven pixels $B_0, B_1, B_2, B_3, B_4, B_5$ and $B_6$. The pixels respectively included in the upper and lower scan lines are not limited to seven, and can be variously altered in number. The pixels $A_0$ to $A_6$ and $B_0$ to $B_6$ are expressed as in the following Equation 1:

$$A_0 = Y(i-1, j-3)$$
$$A_1 = Y(i-1, j-2)$$
$$A_2 = Y(i-1, j-1)$$
$$A_3 = Y(i-1, j)$$
$$A_4 = Y(i-1, j+1)$$
$$A_5 = Y(i-1, j+2)$$
$$A_6 = Y(i-1, j+3)$$
$$B_0 = Y(i+1, j-3)$$
$$B_1 = Y(i+1, j-2)$$
$$B_2 = Y(i+1, j-1)$$
$$B_3 = Y(i+1, j)$$
$$B_4 = Y(i+1, j+1)$$
$$B_5 = Y(i+1, j+2)$$
$$B_6 = Y(i+1, j+3) \quad \text{Equation 1}$$

where "i" denotes the scan line at which the pixel to be interpolated is located, "i−1" denotes the upper scan line, and "i+1" denotes the lower scan line. Herein, Y(i,j) denotes a pixel value (pixel data) of a pixel to be interpolated; i denotes the scan line at which the pixel to be interpolated is located; i−1 denotes the upper scan line; i+1 denotes the lower scan line; and j denotes a horizontal position of a pixel to be interpolated.

When the Line Average is applied to perform deinterlacing, a problem is the jagging that is generated at the low gradient edge. Since the jagging occurring at the low gradient edge is conspicuous, the ELA is effective in improving the picture quality by applying at the low gradient edge to perform the interpolation depending on the edge direction. On the contrary, since the jagging occurring at a high gradient edge is not almost conspicuous to the naked eye, the Line Average does not almost degrade the picture quality despite the interpolation. Rather, the Line Average has an advantage in that erroneous interpolation can be prevented from occurring at the high gradient edge, thereby improving the picture quality. Accordingly, if an image is divided into a low gradient edge region and another region so as to employ an appropriate method depending on each region characteristic, the erroneous interpolation is effectively suppressed and the picture quality is effectively improved.

In order to measure the edge gradient to extract the region characteristic, the horizontal difference and the vertical difference of the pixels are used. The horizontal difference and the vertical difference of the pixels have the following characteristics.

1) At a region having an almost horizontal edge, the vertical difference is larger than the horizontal difference.

2) At a region having an almost vertical edge, the horizontal difference is larger than the vertical difference.

That is, the ELA is applied to the region at which the vertical difference is larger than the horizontal difference to perform the interpolation depending on the edge direction, and the Line Average is applied to the region at which the horizontal difference is larger than the vertical difference to perform the interpolation, thereby preventing the erroneous interpolation. At this time, the horizontal difference and the vertical difference can be adaptive to the image characteristic of such as image brightness or contrast ratio.

Figure 4:
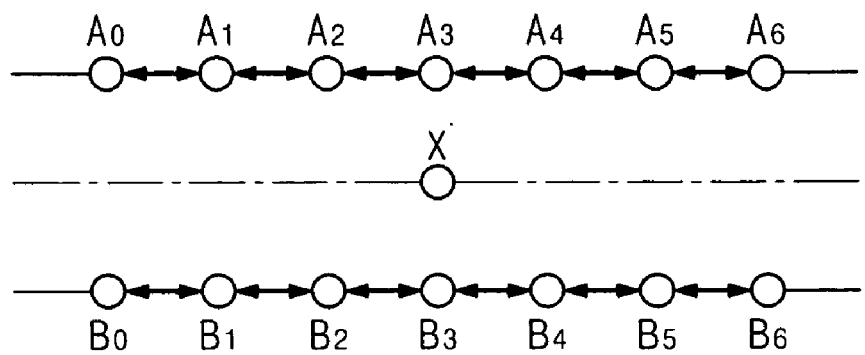
FIG. 4 is a schematic diagram illustrating a method of calculating a mean of vertical difference.

As described above, the interpolation method determining unit 220 functions to measure the edge gradient from the horizontal difference and the vertical difference and to determine a final edge direction from the measured edge gradient. The interpolation method determining unit 220 includes a MHD calculator 221, a MVD calculator 222, and an interpolation direction decider 223. The MHD calculator 221 calculates a mean value of absolute values of differences of respective adjacent pixel pairs included in the upper scan line and absolute values of differences of respective adjacent pixel pairs included in the lower scan line, to provide the calculated mean value as the mean of horizontal difference. The MHD calculator 221 selects the pixels $A_0$ to $A_6$ of the upper scan line from the line memory 210, and selects the pixels $B_0$ to $B_6$ of the lower scan line from the external to calculate the MHD in the same method as shown in FIG. 4 and Equation 2.

$$MHD = \frac{\begin{array}{c}|A_0 - A_1| + |A_1 - A_2| + |A_2 - A_3| + \\ |A_3 - A_4| + |A_4 - A_5| + |A_5 - A_6| + \\ |B_0 - B_1| + |B_1 - B_2| + |B_2 - B_3| + \\ |B_3 - B_4| + |B_4 - B_5| + |B_5 - B_6|\end{array}}{12} \quad \text{Equation 2}$$

The MHD has the following characteristics.

1) The MHD is a measurement value of a horizontal-direction difference of the pixel within a window, and is a mean value for adjacent pixels, and is large at the vertical edge or at the high gradient edge.

2) The MHD is large when a high frequency region is included in the window, that is, when a value of the pixel included in the scan line is greatly different.

The MHD can be also expressed in the following.

$$MHD = \frac{1}{2}\left[\frac{\sum_{m=0}^{5}|Y(i-1, j+m) - Y(i-1, j+m+1)|}{6} + \frac{\sum_{m=0}^{5}|Y(i+1, j+m) - Y(i+1, j+m+1)|}{6}\right]$$

Equation 3

The differences between the pixels, which are obtained from the difference between the adjacent pixels, have a larger correlation as a distance is shorter from the pixel to be interpolated. In order to reflect this relation, the MHD uses a weighted value depending on the differences between the pixels and the distance from the pixel to be interpolated, as in the following Equation 4:

$$MHD = \frac{\sum_{m=0}^{5} w\_h_m\{|Y(i-1, j+m) - Y(i-1, j+m+1)| + |Y(i+1, j+m) - Y(i+1, j+m+1)|\}}{2 \cdot \sum_{m=0}^{5} w\_h_m}$$

Equation 4 where "$w\_h_m$" is a weighted value depending on a position of each pixel difference. According to the weighted value, a characteristic of the MHD is determined.

Figure 5:
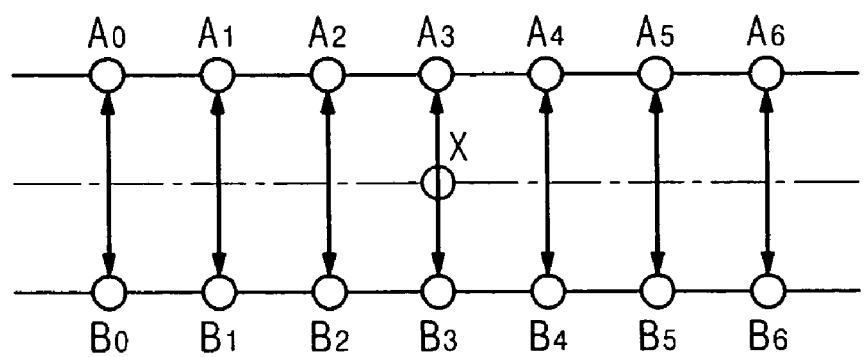
FIG. 5 is a schematic diagram illustrating a method of calculating a mean of horizontal difference.

The MVD calculator 222 calculates a mean value of absolute values of differences of respective facing pixel pairs included in the upper scan line and absolute values of differences of respective facing pixel pairs included in the lower scan line to provide the calculated mean value as the MVD. The MVD calculator 222 selects the pixels $A_0$ to $A_6$ of the upper scan line from the line memory 210, and selects the pixels $B_0$ to $B_6$ of the lower scan line from the external to calculate the MVD as in FIG. 5 and Equation 5.

$$MVD = \frac{1}{2} \cdot \frac{|A_0 - B_0| + |A_1 - B_1| + |A_2 - B_2| + |A_3 - B_3| + |A_4 - B_4| + |A_5 - B_5| + |A_6 - B_6|}{(7)}$$

Equation 5

In the Equation 5, since respective difference values corresponding to a numerator component of the MVD are obtained from the differences between the pixels that are spaced away by a two-pixel distance, the MVD is multiplied by ½ so as to obtain the difference value of one-pixel distance. The MVD has the following characteristics.

1) The MVD is a measurement value of a vertical-direction difference of the pixel within the window, and is a mean value for the one-pixel distance, and is large at the horizontal edge or at the low gradient edge.

2) The MVD is large when the high frequency region is included in the window, that is, when the value of the pixel within the image is greatly different.

In the same manner as the MHD, the MVD provides a larger correlation for the differences between the pixels, which are obtained from the difference between the adjacent pixels, as the distance is shorter from the pixel to be interpolated. The MVD having the weighted value so as to reflect this relation is expressed in the following Equation 6:

$$MVD = \frac{\sum_{n=0}^{5} w\_v_n |Y(i-1, j+n) - Y(i+1, j+n)|}{\sum_{n=0}^{5} w\_v_n}$$

Equation 6 where "$w\_v_n$" is a weighted value depending on a position of each pixel difference. According to the weighted value, a characteristic of the MVD is also determined.

The interpolation direction decider 223 determines the interpolation method by using the MHD and the MVD. The following relations can be derived using properties of the MHD and the MVD.

1) If there is the vertical edge or the high gradient edge in the window, the MHD is larger than the MVD.

2) If there is the horizontal edge or the low gradient edge in the window, the MHD is smaller than the MVD.

At the low gradient edge region at which it is sure when the MHD is smaller than the MVD, the decider 223 determines the ELS as the interpolation method, and at another region, the decider 223 determines the Line Average as the interpolation method. At this time, the Line Average is the same as the ELA performing the vertical-direction interpolation. A detailed description thereof is made below. When the MHD and the MVD are compared to divide the regions, an angle detection coefficient "a" is added for comparison in the following to allow the edge gradient to be controlled, thereby varying an interpolation degree.

1) In case of the MVD≦a·MHD, the region has the high gradient edge.

2) In case of the MVD>a·MHD, the region has the low gradient edge.

The conventional method using a fixed critical value has a drawback in that performance is varied depending on the image characteristic. Generally, a critical value uses a value that is optimized through an experiment in a general image. If the image characteristic is varied when the optimized value is used as the critical value, the critical value should be varied so as to maintain inherent performance. However, if the fixed critical value is used, the fixed critical value cannot correspond to the variation of the image characteristic. Accordingly, there is a drawback in that it is difficult to expect an optimal performance. That is, this drawback can occur in case that the brightness of the image is varied when the critical value, which is used as a brightness reference, is fixed, and in case that the contrast ratio of the image is varied when the critical value, which is used as a difference reference, is fixed. Further, this drawback can occur even when there are regions having different characteristics within one field, that is, even when there are regions having different brightnesses or contrast ratios within the same image.

Since the MHD and the MVD do not have the mean value, they are not influenced by brightness variation. Further, since the MHD and the MVD are compared with each other to determine the final edge direction, the performance is constantly maintained irrespective of the highness or lowness of the contrast ratio. This means that a region division method using the MHD and the MVD has an adaptive characteristic to the variation of the brightness or the contrast ratio. Accordingly, the conventional method using the fixed critical value has a drawback in that the performance is varied depending on the image characteristic, whereas the adaptive region division method according to the present invention can maintain a stable performance irrespective of the image characteristic.

Hereinafter, operation of the edge direction determining unit 230 is in detail described. The edge direction determining unit 230 searches the pixels having the largest similarity to determine the directions of the searched pixels as temporary edge directions. The pixels on the edge use a property of having the largest similarity such that the pixels having the largest similarity are searched to perform the interpolation according to the directions of the searched pixels. The largest similarity between two pixels means that the difference value is small. Therefore, the edge-direction determining unit 230 calculates the difference value for respective pixel pair combinations, and searches the pixel pair combination having the smallest difference value.

FIGS. 6A to 6M are views illustrating the respective pixel pair combinations.

The pixel pair combination includes at least one pixel pair, and includes two pixels each one from each of the upper and lower scan lines with reference to the pixel to be interpolated. The pixel pairs within the pixel pair combination are adjacent to one another, and the pixel pair combinations have the different directions from one another.

In case that the upper and lower scan lines respectively include seven pixels, the edge directions are 13 in all as shown in FIGS. 6A through 6M. A first pixel pair combination shown in FIG. 6A includes a pixel pair 301a that is comprised of the pixel $A_6$ of the upper scan line 31 and the pixel $B_0$ of the lower scan line 32. A second pixel pair combination of FIG. 6B includes a pixel pair 302a that is comprised of the pixel $A_0$ of the upper scan line 31 and the pixel $B_6$ of the lower scan line 32. A third pixel pair combination of FIG. 6C includes a pixel pair 303a that is comprised of the pixel $A_5$ of the upper scan line 31 and the pixel $B_0$ of the lower scan line 32, and a pixel pair 303b that is comprised of the pixel $A_6$ of the upper scan line 31 and the pixel $B_1$ of the lower scan line 32. A fourth pixel pair combination of FIG. 6D includes a pixel pair 304a that is comprised of the pixel A0 of the upper scan line 31 and the pixel B5 of the lower scan line 32, and a pixel pair 304b that is comprised of the pixel A1 of the upper scan line 31 and the pixel $B_6$ of the lower scan line 32. In this manner, fifth to thirteenth pixel pair combinations are constructed as shown in FIGS. 6E through 6M.

Figure 6A:
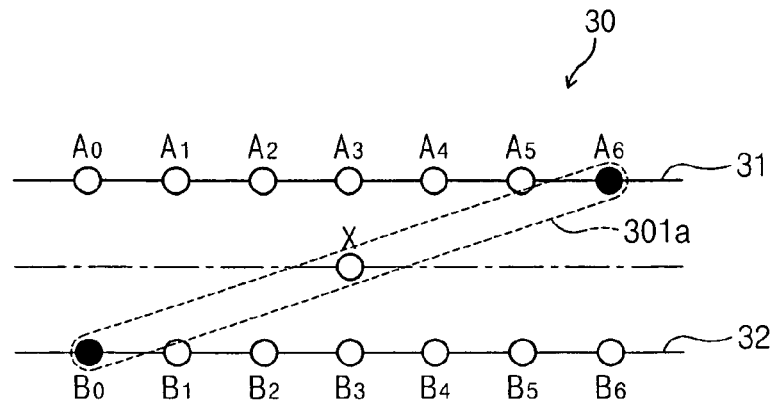
FIGS. 6A through 6M are schematic diagrams illustrating pixel pair combinations.
Figure 6B:
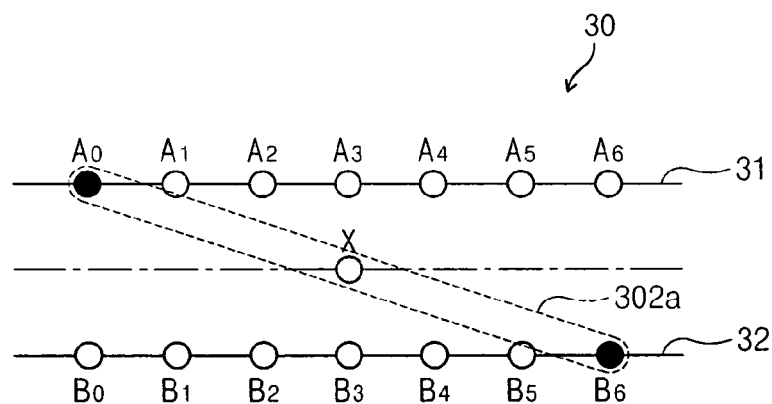
Figure 6C:
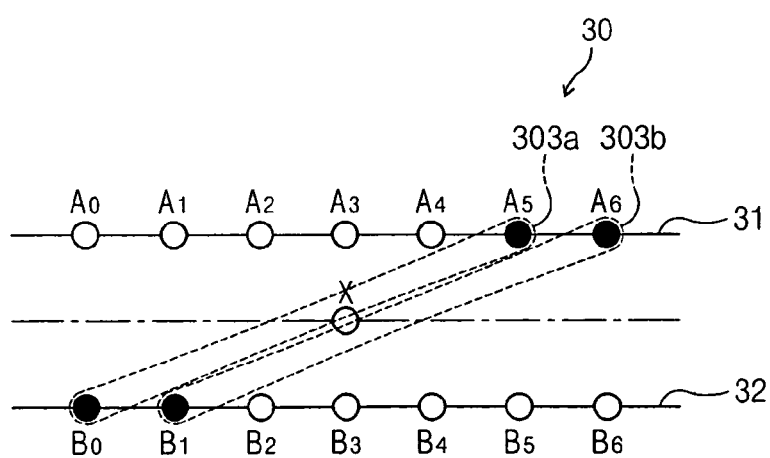
Figure 6D:
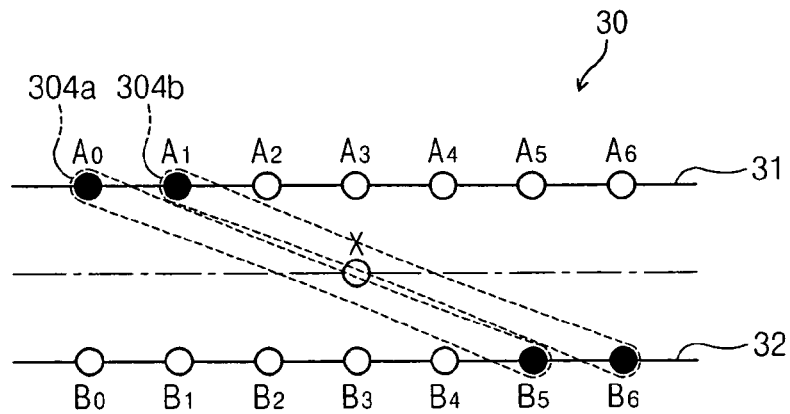

The edge-direction determining unit 230 includes a plurality of correlation calculators 231 to 233 and an edge direction decider 234. The correlation calculators 231 to 233 respectively correspond to the pixel pair combinations shown in FIGS. 6A through 6M, and calculate the correlations of the corresponding pixel pair combinations. The correlation of the pixel pair combination is calculated from the difference value of the pixel pairs included in the pixel pair combination. The correlation of the pixel pair combination having the smallest difference value is largest. For example, the difference value of the first pixel pair combination shown in FIG. 6A is $|A_6-B_0|$, and the difference value of the third pixel pair combination shown in FIG. 6C is $$\frac{|A_5 - B_0| + |A_6 - B_1|}{2},$$

and the difference value of the fifth pixel pair combination is $$\frac{|A_4 - B_0| + |A_5 - B_1| + |A_6 - B_2|}{3}.$$

In this embodiment, the correlation calculators 231 to 233 are required in the total number of 13, and the number of the correlation calculators consistent with the number of the pixel pair combinations. In the above-mentioned manner, the difference value of each of the pixel pair combinations is calculated. The correlation of the pixel pair combination having the smallest difference value is largest. The direction of the pixel pair combination having the smallest difference value is determined to be the edge direction. Hereinafter, a description for the decision of the edge direction will, be in detail made.

When the pixel difference is obtained to search the edge direction, several pixel differences having the same direction are averaged and used such that they are little influenced by a high frequency component. At this time, in order to refer to the differences of the many possible pixels within a limited size of window, a method of referring to the differences of the pixels of the variable number depending on each direction is used as described above.

As the number of the pixels referred in each direction is increased, an error probability is decreased and a reliability of edge direction is increased, but a gradient kind of the edge, which can be interpolated, is decreased. In contrast, as the number of the pixel referred in each direction is decreased, the gradient kind of the edge is increased due to the interpolation of up to the low gradient edge, but a probability of erroneous interpolation, which is caused by the high frequency component of the image, is also increased to the extent of the decreased number of the referred pixel difference.

Figure 6E:
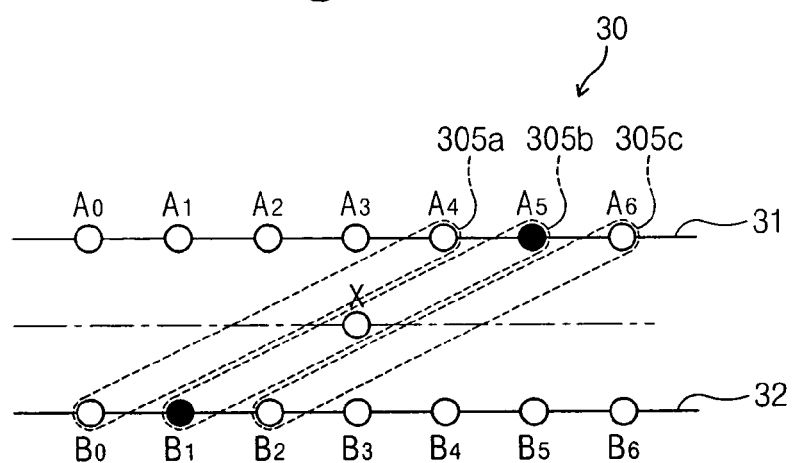
Figure 6F:
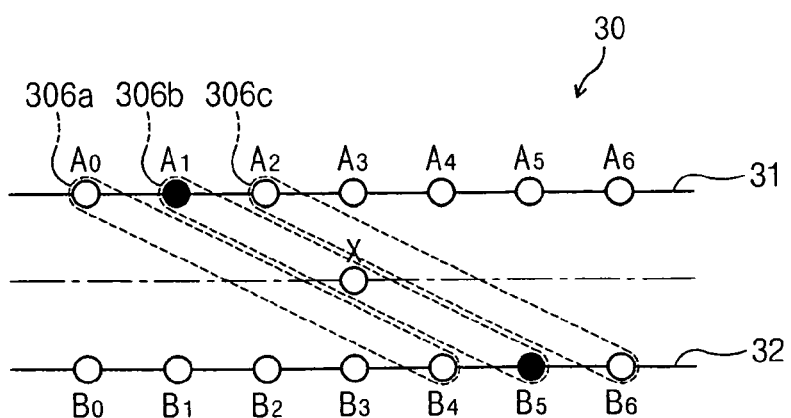
Figure 6G:
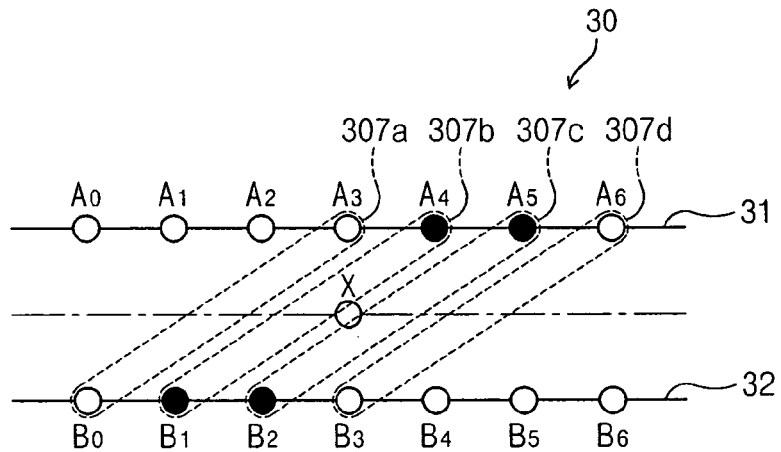
Figure 6H:
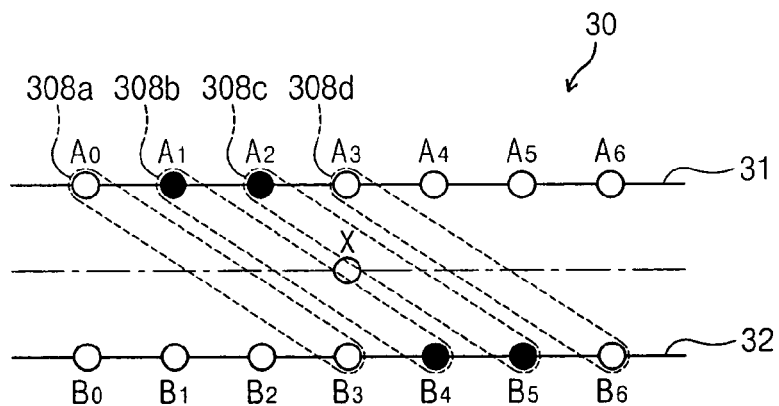
Figure 6I:
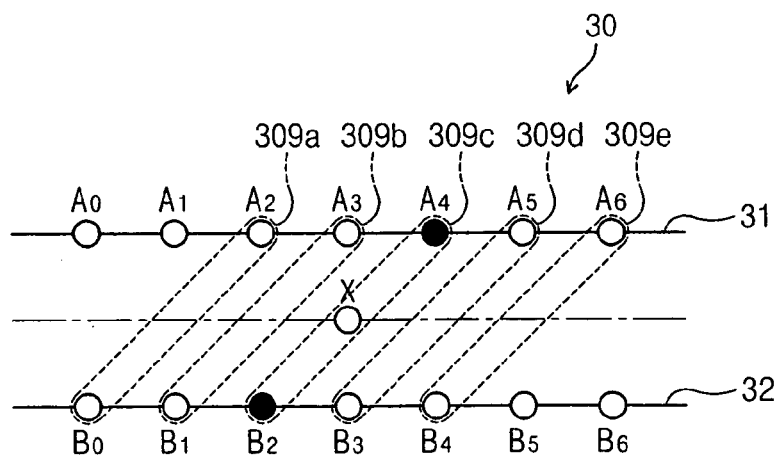
Figure 6J:
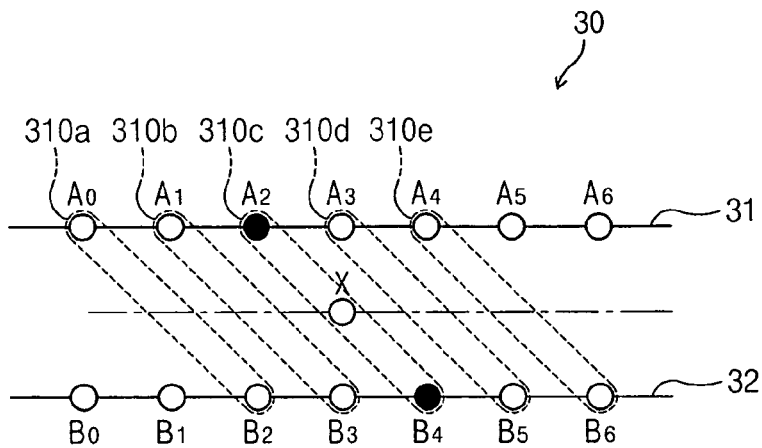
Figure 6K:
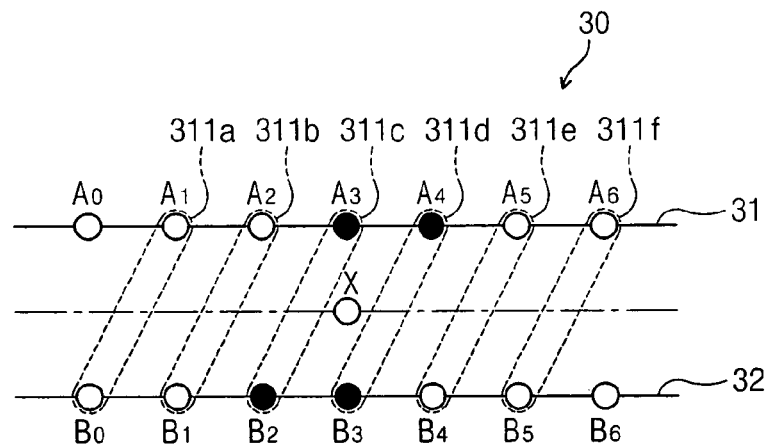
Figure 6L:
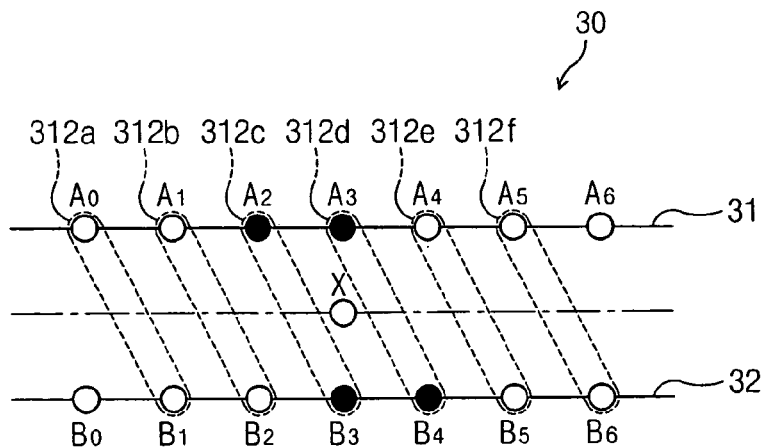

The edge-direction decider 234 receives the difference values from the correlation calculators 231 to 233, and determines the edge direction on the basis of the direction of the pixel pair combination having the smallest difference value. For example, if the first pixel pair combination has the smallest difference value among the pixel pair combinations shown in FIGS. 6A through 6M, a direction of the first pixel pair combination is determined to be the edge direction. Directions of the pixel pair combinations are directions of black-colored pixel pairs among the pixel pair combinations shown in FIGS. 6A through 6M. Black-colored pixels are pixels of the pixel pairs having paths that are most adjacent to the pixel X, among the pixel pairs of the pixel pair combinations. For example, the direction of the pixel pair combination shown in FIG. 6A is a direction of the pixel pair 301a, the direction of the pixel pair combination shown in FIG. 6C is a direction of a middle value of the pixel pairs 303a and 303b, and the direction of the pixel pair combination shown in FIG. 6E is a direction of a pixel pair 305b. Directions of remaining pixel pair combinations are set in the same manner as above.

The interpolating unit 240 performs the interpolation according to the interpolation method that is determined at the interpolation-method determining unit 220 and the edge direction that is determined at the edge-direction determining unit 230. The interpolating unit 240 includes a plurality of interpolators 241 to 243, an interpolation direction decider 244 and a selector 245.

Figure 6M:
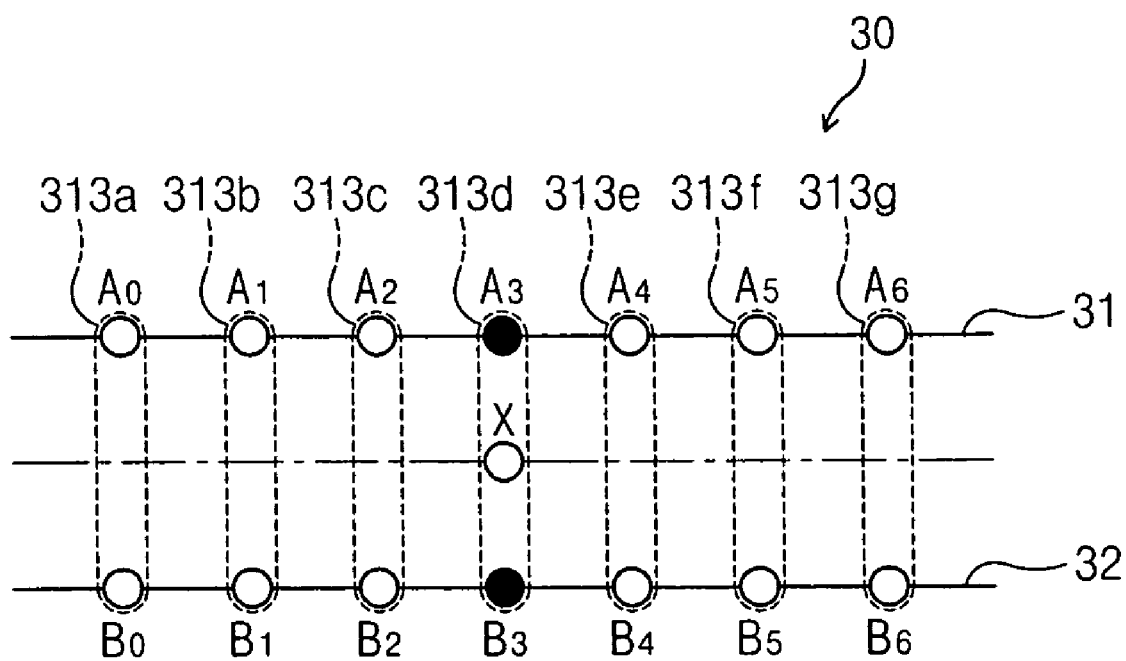

The interpolators 241 to 243 respectively correspond to the pixel pair combinations shown in FIGS. 6A through 6M. In this embodiment, since seven pixels are respectively included in the upper and lower scan lines, the interpolators 241 to 243 are 13 in total. Therefore, the interpolators 241 to 243 correspond to the correlation calculators 231 to 233. Each of the interpolators 241 to 243 selects the pixels $A_0$ to $A_6$ of the upper scan line from the line memory 210 and selects the pixels $B_0$ to $B_6$ of the lower scan line from the external to calculate the interpolation value. Each of the interpolators 211 to 243 calculates the mean value of the black-colored pixels among the pixels shown in FIGS. 6A through 6M, as the interpolation value. If odd numbered pixel pairs are included in one pixel pair combination, the pixels of the pixel pair having the path, which passes on the pixel X to be interpolated, are used for calculating the interpolation value. If even numbered pixel pairs are included in one pixel pair combination, the pixels of two pixel pairs having the path, which is most adjacent to the pixel X to be interpolated, are used for calculating the interpolation value. For example, the interpolation value of the black-colored pixels $A_6$ and $B_0$ shown in FIG. 6A is $$\frac{A_6 + B_0}{2},$$

the interpolation value of the pixels $A_5$, $A_6$, $B_0$ and $B_1$ of FIG. 6C is $$\frac{A_5 + B_0 + A_6 + B_1}{4},$$

and the interpolation value of the pixels $A_3$ and $B_3$ shown in FIG. 6M is $$\frac{A_3 + B_3}{2}.$$

As well known in the art, the mean value $$\frac{A_3 + B_3}{2}$$

of the pixels $A_3$ and $B_3$ is commonly used in all of the ELA and the Line Average.

The interpolation direction decider 244 outputs a selection signal for selecting any one of the interpolation values of the interpolators 241 to 243, in response to the interpolation method that is determined by the interpolation-method determining unit 220 and the edge direction that is determined by the edge-direction determining unit 230. If the interpolation method determined by the interpolation-method determining unit 220 is the ELA, the interpolation direction decider 244 outputs the selection signal for allowing the interpolation to be performed in the direction of the pixel pair combination having the smallest difference value that is determined by the edge direction decider 234. In contrast, if the interpolation method determined by the interpolation-method determining unit 220 is the Line Average, the interpolation direction decider 244 outputs the selection signal for allowing the mean value $$\frac{A_3 + B_3}{2}$$

of the pixels $A_3$ and $B_3$ to be outputted as data F'(t) of the pixel X, as shown in FIG. 6M, so as to perform the interpolation in the vertical direction. The selector 245 outputs any one of the interpolation values of the interpolators 241 to 243 as data F'(t) of the pixel X, in response to the selection signal of the interpolation direction decider 244.

As described above, the present invention divides the field to be interpolated into the low gradient edge region and the region having other characteristics and then, applies the ELA at the low gradient edge region to minimize the jagging and applies the Line Average at another region to minimize the error, thereby improving an entire picture quality. The present invention has the stable performance by using the horizontal difference and the vertical difference that are adaptive to the image characteristic at the time of dividing into two regions, in comparison with the conventional method using the fixed critical value. When the ELA is used to search the direction having the large similarity, the present invention obtains and averages the maximal-numbered pixel difference values, which are available within the window, for respective directions, thereby preventing erroneous interpolation from being caused by the high frequency component.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A deinterlacing method comprising the steps of:
   measuring an edge gradient from a series of pixels provided in an upper scan line and a series of pixels provided in a lower scan line with reference to a pixel to be interpolated;
   determining an interpolation-method on the basis of the measured edge gradient;
   calculating a plurality of difference values for each of a plurality of pixel pair combinations, each of the pixel pair combinations having at least one pixel pair, the pixel pair having two pixels each of which belongs to one of the upper and lower scan lines with reference to the pixel to be interpolated, the pixel pairs of the pixel pair combinations being adjacent to one another and the pixel pair combinations having different directions from one another;
   determining an edge direction on the basis of a direction of the pixel pair combination having the smallest of the calculated plurality of difference values; and
   performing an interpolation for the pixel using the determined interpolation method and the determined edge direction.

2. The deinterlacing method of claim 1, wherein the edge gradient measuring step comprises the steps of:
   obtaining a MHD (Mean of Horizontal Difference) of the pixels provided in the upper and lower scan lines; and
   obtaining a MVD (Mean of Vertical Difference) of the pixels provided in the upper and lower scan lines.

3. The deinterlacing method of claim 2, wherein the MHD is a mean value of absolute values of differences of respective adjacent pixel pairs provided in the upper scan line and absolute values of differences of respective adjacent pixel pairs provided in the lower scan line.

4. The deinterlacing method of claim 2, wherein the MVD is a mean value of absolute values of differences of respective facing pixel pairs among the pixels provided in the upper scan line and the pixels provided in the lower scan line.

5. The deinterlacing method of claim 2, wherein in the interpolation method determining step, the interpolation method is determined on the basis of a relation of the MHD and the MVD.

6. The deinterlacing method of claim 5, wherein in the interpolation method determining step, when the MHD is larger than the MVD, a Line Average is determined to be the interpolation method.

7. The deinterlacing method of claim 5, wherein in the interpolation-method determining step, when the MVD is not larger than the MHD, an ELA (Edge-based Line Average) is determined to be the interpolation method.

8. The deinterlacing method of claim 7, wherein in the edge-direction determining step, when the determined interpolation method is the ELA, a direction of a pixel pair, which is adjacent to the pixel to be interpolated, among the pixel pairs of the pixel pair combination having the smallest difference value, is determined to be the edge direction.

9. The deinterlacing method of claim 8, wherein in the edge direction determining step, when the pixel pair combination having the smallest of the calculated plurality of difference values have odd-numbered pixel pairs, a direction of a pixel pair, which passes over the pixel to be interpolated, among the pixel pairs, is determined to be the edge direction.

10. The deinterlacing method of claim 9, wherein in the interpolation performing step, when the pixel pair combination having the smallest difference value has the odd-numbered pixel pairs, a mean value of two pixels having the determined edge direction is set as a value of a pixel to be interpolated.

11. The deinterlacing method of claim 8, wherein in the edge direction determining step, when the pixel pair combination having the smallest difference value has even-numbered pixel pairs, a direction between two pixel pairs, which are adjacent to the pixel to be interpolated, among the pixel pairs, is determined to be the edge direction.

12. The deinterlacing method of claim 11, wherein in the interpolation performing step, when the pixel pair combination having the smallest of the calculated plurality of difference values have the even-numbered pixel pairs, a mean value of four pixels adjacent to the determined edge direction is set as the value of the pixel to be interpolated.

13. The deinterlacing method of claim 6, wherein in the interpolation performing step, when the determined interpolation method is a Line Average, a mean value of two pixels having a vertical direction with respect to the pixel to be interpolated, among the pixels provided in the upper and lower scan lines, is set as the value of the pixel to be interpolated.

14. The deinterlacing method of claim 1, wherein the difference value of the pixel pair combination is a mean value of an absolute value of a difference value of at least one pixel pair provided in the pixel pair combination.

15. A deinterlacing device comprising:
an interpolation method determining unit for measuring an edge gradient from a series of pixels provided in an upper scan line and a series of pixels provided in a lower scan line with reference to a pixel to be interpolated, and determining an interpolation method on the basis of the measured edge gradient;
an edge direction determining unit for calculating a correlation for each of pixel pair combinations, and determining an edge direction on the basis of a direction of a pixel pair combination having the largest correlation among the pixel pair combinations, each of the pixel pair combinations having at least one pixel pair, each of the pixel pairs having two pixels each of which belongs to each of the upper and lower scan lines with reference to the pixel to be interpolated, the pixel pairs of the pixel pair combination being adjacent to one another, the pixel pair combinations having different directions from one another; and
an interpolating unit for performing an interpolation for the pixel using the determined interpolation method and the determined edge direction.

16. The deinterlacing device of claim 15, wherein the interpolation method determining unit comprises:
a MHD (Mean of Horizontal Difference) calculator for obtaining a MHD of the pixels provided in the upper and lower scan lines;
a MVD (Mean of Vertical Difference) calculator for obtaining a MVD of the pixels provided in the upper and lower scan lines; and
an interpolation method determiner for determining the interpolation method on the basis of the MHD and the MVD.

17. The deinterlacing device of claim 16, wherein the MHD is a mean value of absolute values of differences of respective adjacent pixel pairs provided in the upper scan line and absolute values of differences of respective adjacent pixel pairs provided in the lower scan line.

18. The deinterlacing device of claim 17, wherein when the upper and lower scan lines respectively have the number (2N+1) of pixels, the MHD is calculated in the following Equation:

$$MHD = \frac{\sum_{m=-N}^{N-1} w\_h_m \{|Y(i-1, j+m) - Y(i-1, j+m+1)| + |Y(i+1, j+m) - Y(i+1, j+m+1)|\}}{2 \cdot \sum_{m=-N}^{N} w\_h_m}$$

where "$w\_h_m$" is a weighted value depending on a position of each pixel difference.

19. The deinterlacing device of claim 16, wherein the MVD is a mean value of absolute values of differences of respective facing pixel pairs among the pixels provided in the upper scan line and the pixels provided in the lower scan line.

20. The deinterlacing device of claim 19, wherein when the upper and lower scan lines respectively has the number (2N+1) of pixels, the MVD is calculated in the following Equation:

$$MVD = \frac{\sum_{n=-N}^{N} w\_v_n |Y(i-1, j+n) - Y(i+1, j+n)|}{\sum_{n=-N}^{N} w\_v_n}$$

where "w_v$_n$" is a weighted value depending on a position of each pixel difference.

21. The deinterlacing device of claim 16, wherein the interpolation method determiner determines a Line Average to be the interpolation method when the MHD is larger than the MVD.

22. The deinterlacing device of claim 21, wherein the interpolation method determiner determines an ELA (Edge-based Line Average) to be the interpolation method when the MVD is not larger than the MHD.

23. The deinterlacing device of claim 22, wherein the edge-direction determining unit comprises:
a correlation calculator for calculating the correlation of each of the pixel pair combinations; and
an edge direction determiner for determining the edge direction on the basis of the pixel pair combination having the largest correlation among the pixel pair combinations.

24. The deinterlacing device of clam 23, wherein the correlation calculator comprises a plurality of calculating units respectively corresponding to the pixel pair combinations, for calculating a difference value of the corresponding pixel pair combination.

25. The deinterlacing device of clam 24, wherein the difference value of the pixel pair combination is a mean value of an absolute value of a difference value of at least one pixel pair provided in the pixel pair combination.

26. The deinterlacing device of claim 25, wherein when the determined interpolation method is the ELA, the edge direction determining unit determines, as the edge direction, a direction of a pixel pair, which is adjacent to the pixel to be interpolated, among the pixel pairs of the pixel pair combination having the smallest difference value.

27. The deinterlacing device of claim 26, wherein when the pixel pair combination having the smallest difference value has odd-numbered pixel pairs, the edge direction determiner determines, as the edge direction, a direction of a pixel pair, which passes over the pixel to be interpolated, among the pixel pairs.

28. The deinterlacing device of claim 27, wherein when the pixel pair combination having the smallest difference value has the odd-numbered pixel pairs, the interpolating unit sets, as a value of the pixel to be interpolated, a mean value of two pixels having the determined edge direction.

29. The deinterlacing device of claim 27, wherein when the pixel pair combination having the smallest difference value has even-numbered pixel pairs, the edge direction determiner determines, as the edge direction, a direction between two pixel pairs, which are adjacent to the pixel to be interpolated, among the pixel pairs.

30. The deinterlacing device of claim 29, wherein when the pixel pair combination having the smallest difference value has the even-numbered pixel pairs, the interpolating unit sets, as the value of the pixel to be interpolated, a mean value of four pixels adjacent to the determined edge direction.

31. The deinterlacing device of claim 26, wherein when the determined interpolation method is a Line Average, the interpolating unit determines, as the value of the pixel to be interpolated, a mean value of two pixels having a vertical direction with respect to the pixel to be interpolated, among the pixels provided in the upper and lower scan lines.

32. The deinterlacing device of claim 28, wherein the interpolating unit comprises:
a plurality of interpolators respectively corresponding to the pixel pair combinations, for calculating an interpolation value from the corresponding pixel pair combination; and
a selector for selecting one of the interpolation values of the interpolators, as the value of the pixel to be interpolated, depending on the interpolation method determined by the interpolation method determining unit and the edge direction determined by the edge direction determining unit.

33. The deinterlacing device of claim 32, wherein each of the interpolators calculates a mean value of at least one pixel pair, which is adjacent to the pixel to be interpolated, among the pixel pairs provided in the corresponding pixel pair combination, and outputs the calculated mean value as the interpolation value.

34. The deinterlacing device of claim 33, wherein when the pixel pair combination having the smallest difference value has the odd-numbered pixel pairs, each of the interpolators sets, as the value of the pixel to be interpolated, the mean value of two pixels having the determined edge direction.

35. The deinterlacing device of claim 34, wherein when the pixel pair combination having the smallest difference value has the even-numbered pixel pairs, the interpolating unit sets, as the value of the pixel to be interpolated, the mean value of four pixels adjacent to the determined edge direction.

* * * * *